US010505630B2

(12) United States Patent
Knapp et al.

(10) Patent No.: US 10,505,630 B2
(45) Date of Patent: Dec. 10, 2019

(54) DETERMINING POSITION VIA MULTIPLE CAMERAS AND VLC TECHNOLOGY

(71) Applicant: GENERAL ELECTRIC COMPANY, Schenectady, NY (US)

(72) Inventors: Thomas Alexander Knapp, Cleveland, OH (US); Colin Drew McKibben, East Cleveland, OH (US); Philip James Ellis, Willoughby, OH (US)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 26 days.

(21) Appl. No.: 15/810,286

(22) Filed: Nov. 13, 2017

(65) Prior Publication Data
US 2018/0138976 A1  May 17, 2018

Related U.S. Application Data

(60) Provisional application No. 62/421,673, filed on Nov. 14, 2016.

(51) Int. Cl.
*H04B 10/00* (2013.01)
*H04B 10/116* (2013.01)

(52) U.S. Cl.
CPC ................... *H04B 10/116* (2013.01)

(58) Field of Classification Search
CPC .................................................. H04B 10/116
USPC ......................................................... 398/118
See application file for complete search history.

(56) References Cited

U.S. PATENT DOCUMENTS

| | | | |
|---|---|---|---|
| 9,948,394 B1* | 4/2018 | Bitra | H04B 10/116 |
| 10,057,727 B2* | 8/2018 | Maricic | H04W 4/043 |
| 10,244,597 B1* | 3/2019 | Scott | H05B 33/0845 |
| 2014/0232903 A1* | 8/2014 | Oshima | H04N 5/3532 348/229.1 |
| 2015/0189724 A1* | 7/2015 | Karc | H05B 37/0272 315/149 |
| 2015/0373503 A1* | 12/2015 | Jovicic | G01S 5/0252 455/456.1 |
| 2016/0028477 A1* | 1/2016 | Jovicic | H04B 10/116 398/118 |
| 2016/0261840 A1 | 9/2016 | Nakashima | |
| 2017/0364348 A1* | 12/2017 | Klitenik | H04L 12/2814 |
| 2018/0076891 A1* | 3/2018 | Agrawal | H04B 10/116 |
| 2018/0212678 A1* | 7/2018 | Gummadi | H04B 10/116 |

\* cited by examiner

*Primary Examiner* — Tesfaldet Bocure
(74) *Attorney, Agent, or Firm* — Buckley, Maschoff & Talwalkar, LLC

(57) ABSTRACT

A position determination system is disclosed, which comprises a mobile device comprising at least two transducers, wherein each transducer is operably connected to at least one single board processor; and a plurality of markers, each associated with a position of an area of interest, the plurality of markers at least one of: operable to transmit signals recognizable by the at least two transducers, and comprising at least one feature recognizable by the at least two transducers.

20 Claims, 6 Drawing Sheets

DETERMINING POSITION VIA MULTIPLE CAMERAS AND VLC TECHNOLOGY

CROSS REFERENCE TO RELATED APPLICATIONS

This application claims the benefit of U.S. provisional application Ser. No. 62/421,673 filed Nov. 14, 2016.

FIELD OF THE INVENTION

The present disclosure generally relates to a positioning technology, and more particularly to a positioning technology that enables an increased coverage.

BACKGROUND

Lighting fixtures, such as troffer-style lighting fixtures, are ubiquitous in industrial spaces, such as warehouses, and in commercial office spaces. Many of these lighting fixtures house linear elongated fluorescent light bulbs, or more recently light-emitting diodes (LEDs), that span the length of the troffer. Such lighting fixtures can be mounted to or suspended from ceilings, and some can be at least partially recessed into the ceiling.

Visible Light Communication (VLC) is a data communications variant which typically utilizes visible light between 400 and 800 THz (780-375 nm wavelengths). VLC is a subset of optical wireless communications technologies, and typically uses fluorescent lamps (ordinary lamps, not special communications devices) to transmit signals at 10 kilobits per second (Kb/s). Or it can use light-emitting diodes (LEDs) to transmit signals up to 500 mega-bits per second (Mbit/s). Mobile electronic devices which generally contain a camera or image sensor (such as an array of photodiodes) are operable to receive the signals from the light sources. VLC can be used as a communications medium for ubiquitous computing, because light-producing devices (such as indoor or outdoor lamps, television monitors, traffic signs, commercial displays and/or car headlights and/or tail-lights) are used everywhere.

In some applications, VLC permits a user with a mobile device that includes a camera (such as a smartphone or a tablet computer) to determine his or her location (for example, a location within a warehouse) by use of a signal transmitted from a light fixture. However, because of limitations involving the field of view and pixel density of a physical camera, the light fixtures need to be placed at a close proximity to each other (in a high density array) so that nearly one hundred percent (100%) coverage can be achieved.

Therefore, it would be advantageous to provide a method and apparatus having an improved effective pixel density and field of view so that the required light fixture density can be decreased while still allowing for the possibility to achieve applications with 100% coverage.

SUMMARY

In one embodiment, a position determination system is disclosed, which comprises a mobile device comprising at least two transducers, wherein each transducer is operably connected to at least one single board processor; and a plurality of markers, each associated with a position of an area of interest, the plurality of markers including at least one of the following characteristics: operable to transmit signals recognizable by the at least two transducers; and comprising at least one feature recognizable by the at least two transducers.

In another embodiment, a mobile device for self-positioning is disclosed, which comprises a mobile device comprising: at least two transducers for recognizing a plurality of markers via recognizable feature of the markers or via signals transmitted from the markers, with at least two single board processors operably connected to at least two transducers respectively.

In another embodiment, a positioning method of a mobile device comprising at least two transducers is disclosed, which comprises steps of recognizing signals or feature of at least one marker via the at least two transducers; and decoding the signals or feature via one or more single board processors of the mobile device to receive position of the mobile device.

BRIEF DESCRIPTION OF THE DRAWINGS

Features and advantages of some embodiments, and the manner in which the same are accomplished, will become more readily apparent with reference to the following detailed description taken in conjunction with the accompanying drawings, which illustrate exemplary embodiments (not necessarily drawn to scale), wherein.

DETAILED DESCRIPTION

Figure 1A:
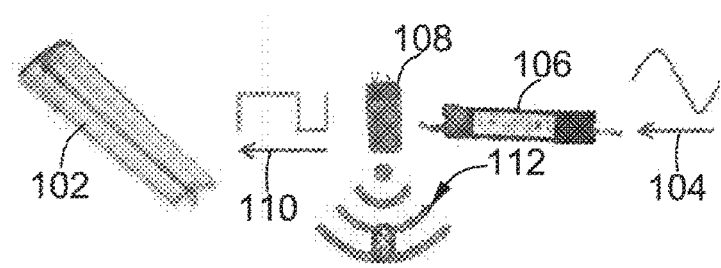
FIGS. 1A and 1B depict a conventional indoor positioning system.

Reference now will be made in detail to illustrative embodiments, one or more examples of which are illustrated in the drawings. Like components and/or items in the various drawings are identified by the same reference number, and each example is provided by way of explanation only and thus does not limit the invention. In fact, it will be apparent to those skilled in the art that various modifications and/or variations can be made without departing from the scope and/or spirit of the invention. For instance, in many cases features illustrated or described as part of one embodiment can be used with another embodiment to yield a further embodiment. Thus, it is intended that the present disclosure covers such modifications and variations as come within the scope of the appended claims and their equivalents.

Embodiments described herein relate to indoor positioning system (IPS) technology utilizing visible light communication (VLC) technology, wherein a user utilizes a mobile device having a camera (for example, a smartphone, laptop computer, or a tablet computer having a digital camera), or a specially designed mobile device having a camera, to determine their location and/or other information via a signal coming from an array of overhead light fixtures (two or more light fixtures). Although conventional VLC technology systems work fairly well, there are limitations (which are related to the field of view and the pixel density associated with a single camera) which require the number of overhead light fixtures (for example, fluorescent light fixtures suspended from a ceiling) to be placed in fairly close proximity to each other to form a high density array in order to achieve 100% coverage of the indoor space (such as a warehouse floor area). In particular, it has been found that the required light fixture density equals the maximum spacing of the light fixtures divided by the height of the ceiling minus four and one half feet, or:

$$\text{Density} = \frac{\text{Max Spacing}}{\text{Height} - 4.5'}$$

Thus, if mobile devices having a single camera (such as some smartphones) are to be used in an indoor positioning system (IPS) system, in order to provide one hundred percent coverage of a room having a ten-foot ceiling height, it has been found that the spacing between any two light fixtures must be seven and one-half feet or less. However, many building owners (such as warehouse building owners) already have an installed system or array of ceiling light fixtures attached to and/or suspended from the ceiling, wherein the light fixtures are spaced apart at greater distances, or in such manner that one-hundred percent coverage of the room using a mobile device with one camera cannot be achieved. The owners of such spaces may be unwilling or unable (due to high costs, for example, associated with purchasing and installing additional light fixtures) to increase and/or improve the light fixture density so that single-camera devices (such as smartphones) will achieve adequate coverage. Thus, in order to alleviate the high density array requirement, disclosed are mobile device embodiments which include multiple camera (2-n number) arrays which serve to increase the effective pixel density and enlarge the field of view resulting in a reduced required fixture density needed to approach or achieve one hundred percent (100%) coverage for a visual light communication (VLC) system.

Figure 1B:
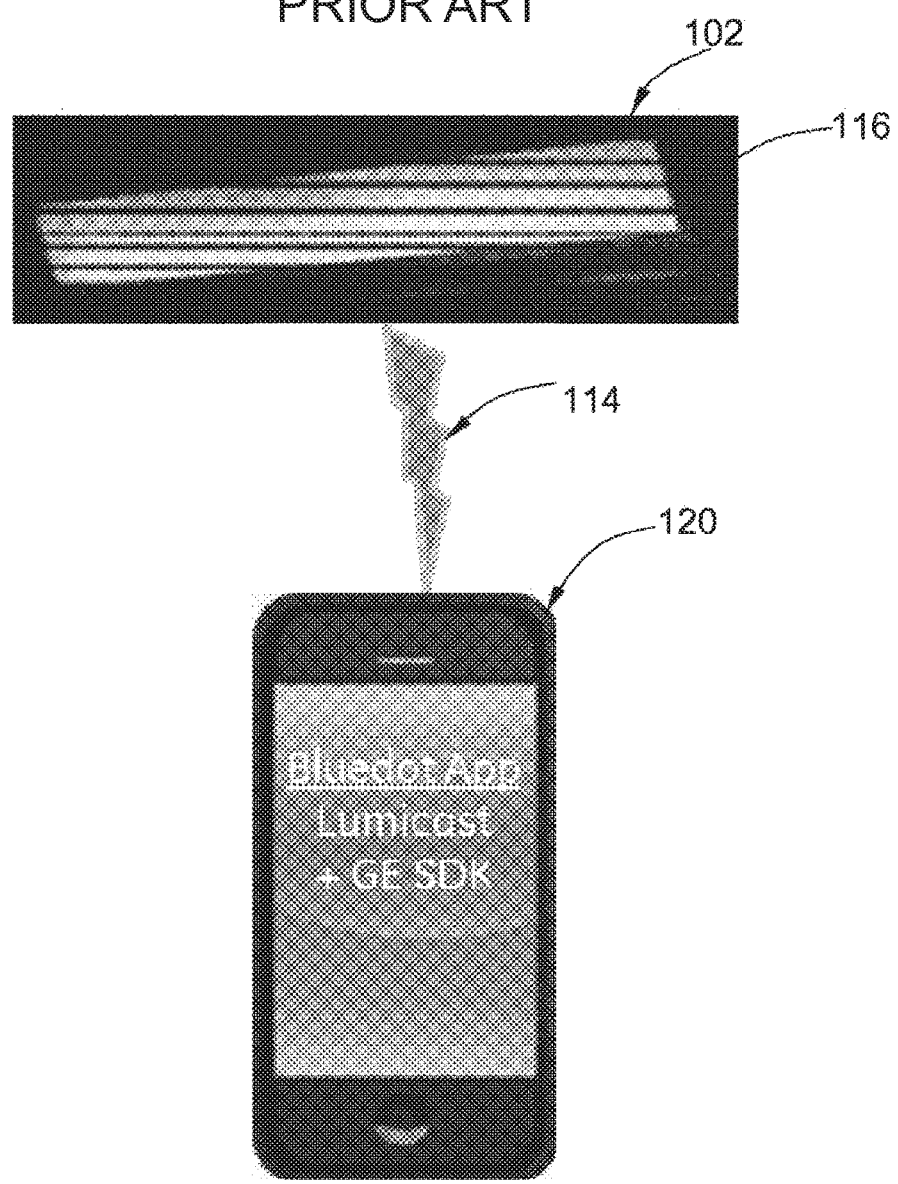

FIGS. 1A and 1B depict examples of components utilized with a conventional indoor positioning system. In FIG. 1A, the light fixture 102 has a light source, such as an LED array. During operation, alternating current 104 from a power source (not shown) is input to an LED driver 106 and then to an indoor positioning system (IPS) modulator 108. The IPS modulator 108 then outputs a signal 110 that changes the frequency of the light source (the LED array) within the fixture 102, causing a rapid flickering of the output light of the light fixture 102 that is invisible to the human eye. For example, an indoor space of a building includes many such LED light fixtures which are spaced apart from one another, and each such LED light fixture includes an IPS modulator 108 that provides a different frequency signal 110 resulting in a different frequency light output that uniquely identifies each LED light fixture. In some embodiments, the IPS modulator 108 is also configured for transmitting and receiving control and/or instruction and/or data signals 112 (via, for example, the Bluetooth protocol), which may be utilized to change frequencies and/or to communicate the present frequency, which can provide an identifier for that particular light fixture 102.

FIG. 1B shows the light fixture 102 of FIG. 1A in operation (emitting light 114) along with a mobile device 120 (which may be a smartphone) having a built in camera (not shown). As depicted, the light fixture 102, when viewed by the camera of the mobile device 120, appears to have a barcode-like pattern 116 across its surface area. With regard to an array of light fixtures, each light fixture of the array in a room will have a different barcode-like pattern because each associated the IPS modulator 108 (see FIG. 1A) injects a different frequency signal to the light source of each one. This is the basis for visual light communication (VLC), as it is how the mobile device determines which light fixture it is currently observing. For example, when the IPS system is operating, the mobile device 120 is taking video recordings of the ceiling containing multiple light fixtures (not shown), and when it sees a particular light fixture, it decodes its barcode pattern to obtain a predetermined numerical identifier (ID) associated with that fixture (which is associated with a location). The numerical ID is then used to look up the location coordinates (which may be "x" and "y" coordinates) of the particular light fixture on a map, which map information may be stored on the mobile device. In addition, in some implementations, image algorithms can be used to calculate the position of the mobile device to high accuracy, such as to within four inches of accuracy, based on the angle, height, and x/y coordinates of the light fixture that the mobile device 120 is observing. In some embodiments, the mobile device 120 may include a memory storing software instructions configured to instruct a mobile device processor to operate in such manner. In addition, in some implementations, a "Bluedot" application and/or a "Lumicast" application and/or a proprietary software development kit (SDK) may be utilized which include instructions configured to instruct the mobile device processor to operate in such manner.

Figure 2:
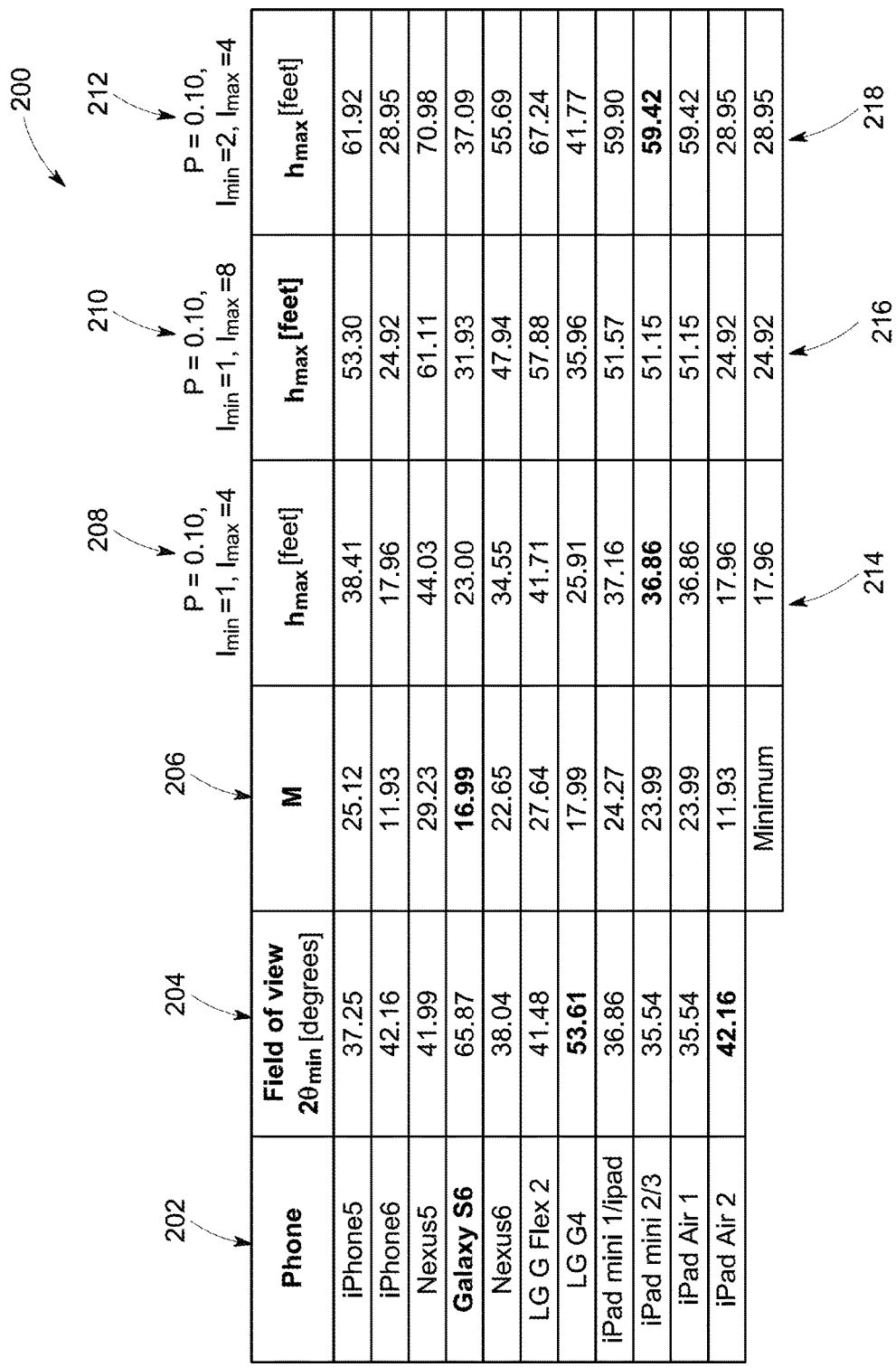
FIG. 2 illustrates a table that includes a listing of mobile devices having single cameras and the required minimum heights of light fixtures for an indoor positioning system to effectively operate.

It has been recognized by the inventors of the present disclosure that mobile devices having a single camera cannot decode VLC signals from a ceiling light fixture mounted at a distance greater than a certain height, as outlined in the table 200 shown in FIG. 2. Referring to FIG. 2, the table 200 includes a mobile device column 202 (which lists various types of mobile telephones and several tablet computers having a single camera), a field of view column 204, a "M" column 206, a first Maximum Height column 208, a second Maximum Height column 210, and a third Maximum Height column 212. The columns of the table 200 show maximum height based on fixture size, and thus a two-foot by four-foot (2'×4') light fixture can be decoded from much farther away than, for example, a one-foot by two-foot (1'×2') light fixture with the same mobile device having a single camera. In addition, in the calculations for the table 200, the angle used is half of the smaller of the two field of view angles of the front facing camera associated with each listed mobile device, which angle can be used if the light fixtures on a ceiling are deployed at a distance from one another so that at least some portion of a light fixture is visible at all tilt angles of the mobile device. If fixtures are farther apart from each other than that, then a larger minimum field of view angle should be used which results in lower maximum mounting heights. It has also been found that applying a wide angle lens to a single camera in an attempt to view more light fixtures distorts the image and results in reducing the maximum height value even further. As shown in this example table 200, in order to accommodate all of the listed devices with the initial conditions of column 208, the minimum height 214 must be approximately 18 feet; with the initial conditions of column 210, the minimum height 216 must be approximately 25 feet; and with the initial conditions of column 212, the minimum height must be approximately 29 feet.

Figure 3A:
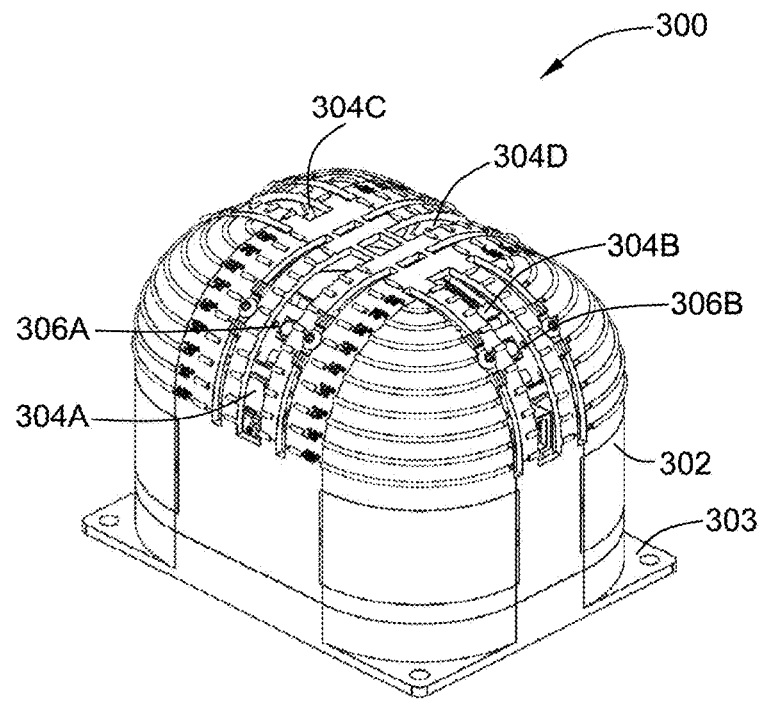
FIG. 3A is a perspective view of a visible light communication (VLC) mobile device in accordance with some embodiments of the disclosure.

FIG. 3A is a perspective view of a VLC mobile device 300 which includes multiple cameras in accordance with some embodiments. In particular, in this implementation, a housing 302 is affixed to a base 303 and includes openings or slots 304A and 304B through which camera lenses 306A and 306B can view one or more light fixtures (not shown). The openings 304C and 304D are also shown, which also permit other associated cameras (not shown) to view light fixtures.

Figure 3B:
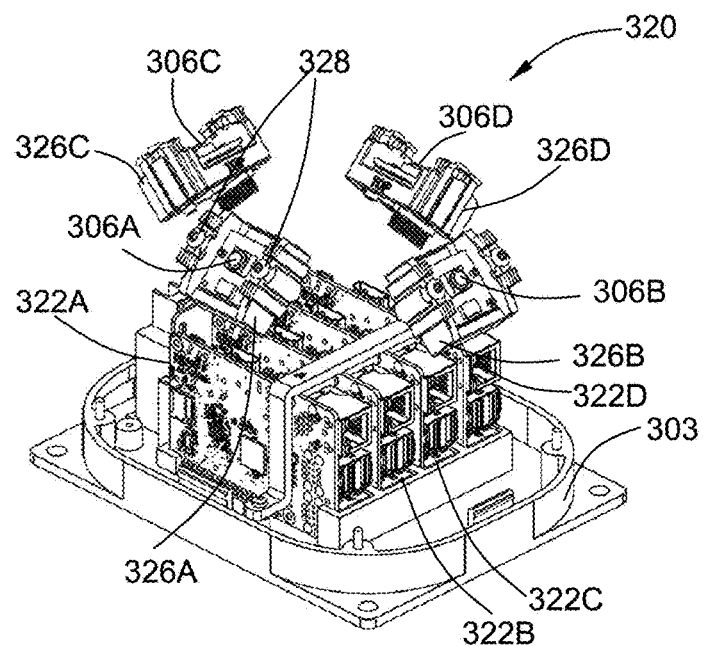
FIG. 3B is a partially-exploded perspective view of the visible light communication (VLC) mobile device of FIG. 3A in accordance with some embodiments of the disclosure.

FIG. 3B is a partially-exploded perspective view 320 of the VLC mobile device 300 of FIG. 3A with the housing 302 removed. As shown, in some embodiments, commercially available single board processors 322A, 322B, 322C and 322D are mounted to the base 303 and are operably connected to associated cameras 306A, 306B, 306C and 306D. In some implementations, the cameras 306A, 306B, 306C and 306D form a camera array that is operable to actively scan a ceiling for light from an array of light fixtures. In addition, in some embodiments the single board processors 322A, 322B, 322C and 322D are Raspberry Pi computers, which are programmable, credit card-sized single-board computers developed in the United Kingdom by the Raspberry Pi Foundation. Other types of single board processors may be employed in place of or in addition to one or more Raspberry Pi computer.

Referring again to FIG. 3B, in some implementations each of the cameras 306A, 306B, 306C and 306D is mounted to a corresponding carrier, 326A, 326B, 326C, and 326D. Each carrier is mounted to the housing 302 (of FIG. 3A) with screws 328. Each carrier 326 may be independently adjusted along its corresponding opening 304. This may be accomplished by any operable means, such as by manually loosening the screws 328 and retightening the screws once the carrier is in its desired position. Alternatively, a servomotor and control arm (not shown) may be implemented to automatically adjust each carrier 326 along its corresponding opening 304. In such an embodiment, each single board processor 322 would drive its corresponding servomotor to adjust the cameras to their desired positions. Accordingly, in the example shown in FIGS. 3A and 3B, in some implementations the VLC mobile device 300 includes four cameras wherein each camera can be automatically angled separately to maximize the field of view of the VLC mobile device (for example, by scanning from light from a light fixture). Thus, in some embodiments multiple cameras (two or more) are placed in an array so that the effective pixel density and the field of view are increased, which results in a reduction in the required light fixture density in an area of interest, while also still potentially achieving 100% location and/or other information coverage for an indoor positioning system (IPS) implementation. In addition, it should be noted that none of the cameras of the camera array has a wide angle lens, which means there is no loss in the height requirement as compared to a mobile device having a single camera using a wide angle lens.

Figure 4:
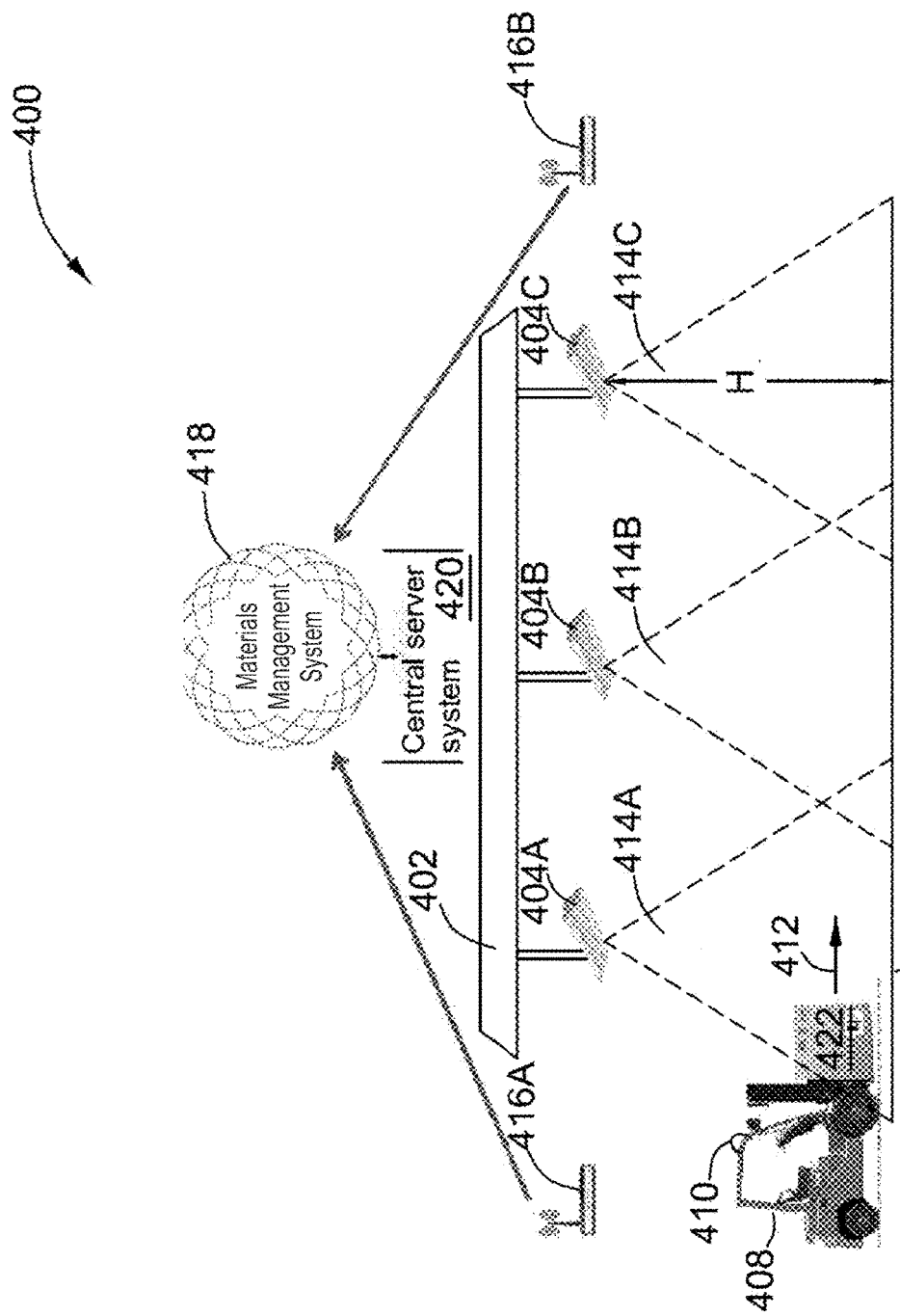
FIG. 4 illustrates an IPS (indoor positioning) system implementation including a plurality of ceiling light fixtures suspended from a ceiling with a height "H" from a warehouse floor and configured to transmit light signals to a visible light communication (VLC) mobile device in accordance with some embodiments.

FIG. 4 illustrates an internal positioning system (IPS) implementation 400 using visual light communication technology in accordance with some embodiments. A plurality of light fixtures 404A, 404B, 404C to 404 . . . N are suspended from a ceiling 402 at a distance or height "H" as measured from a warehouse floor 406. A forklift 408 (or other vehicle, or autonomous robot) carrying cargo 422 includes a VLC mobile device 410 having a camera array (two or more cameras) in accordance with the present disclosure (for example, the VLC mobile device 300 shown in FIG. 3A). In this example, the forklift 408 is traveling in the direction of arrow 412, and thus will enter zones of light 414A, 414B and 414C emitted by the plurality of light fixtures 404A, 404B and 404C as it moves across the floor 406. Thus, the camera array of the VLC mobile device 410 will then receive light signals (in accordance with VLC technology) from the light fixtures 404A, and then 404B, and then 404C. One or more of the single board processors of the VLC mobile device 410 then decodes the light signals and functions to map the location of the forklift 408 as described herein.

In addition, in some embodiments one or more of the single board processors of the VLC mobile device 410 is configured to wirelessly transmit data to one or more wireless routers 416A, 416B as the forklift 408 moves within range of any particular router. For example, in an implementation, when the VLC mobile device 410 enters light zone 414C, at least one of the single board processors decodes the light signals from the light fixture 404C, maps the location of the forklift 408, and wirelessly transmits data to the router 416B. In some embodiments, the routers 416A and 416B are also configured to wirelessly transmit the location data (and/or other information) associated with the forklift 408 to a materials management system 418, which may be located in a cloud system. In addition, in some implementations the materials management system 418 may communicate with a central server system 420 operated by, for example, the owner of the warehouse utilizing the IPS system. Examples of information that may be transmitted to the materials management system include, but are not limited to a pallet identification number (associated with the cargo 422 being carried by the forklift 408), x and y coordinates representing the location of the forklift on the warehouse floor 406, and a time of receipt of the location data as the forklift 408 moves to each of the light zones 414A, 414B and/or 414C within view of the associated light fixtures 404A to 404C.

Figure 5:
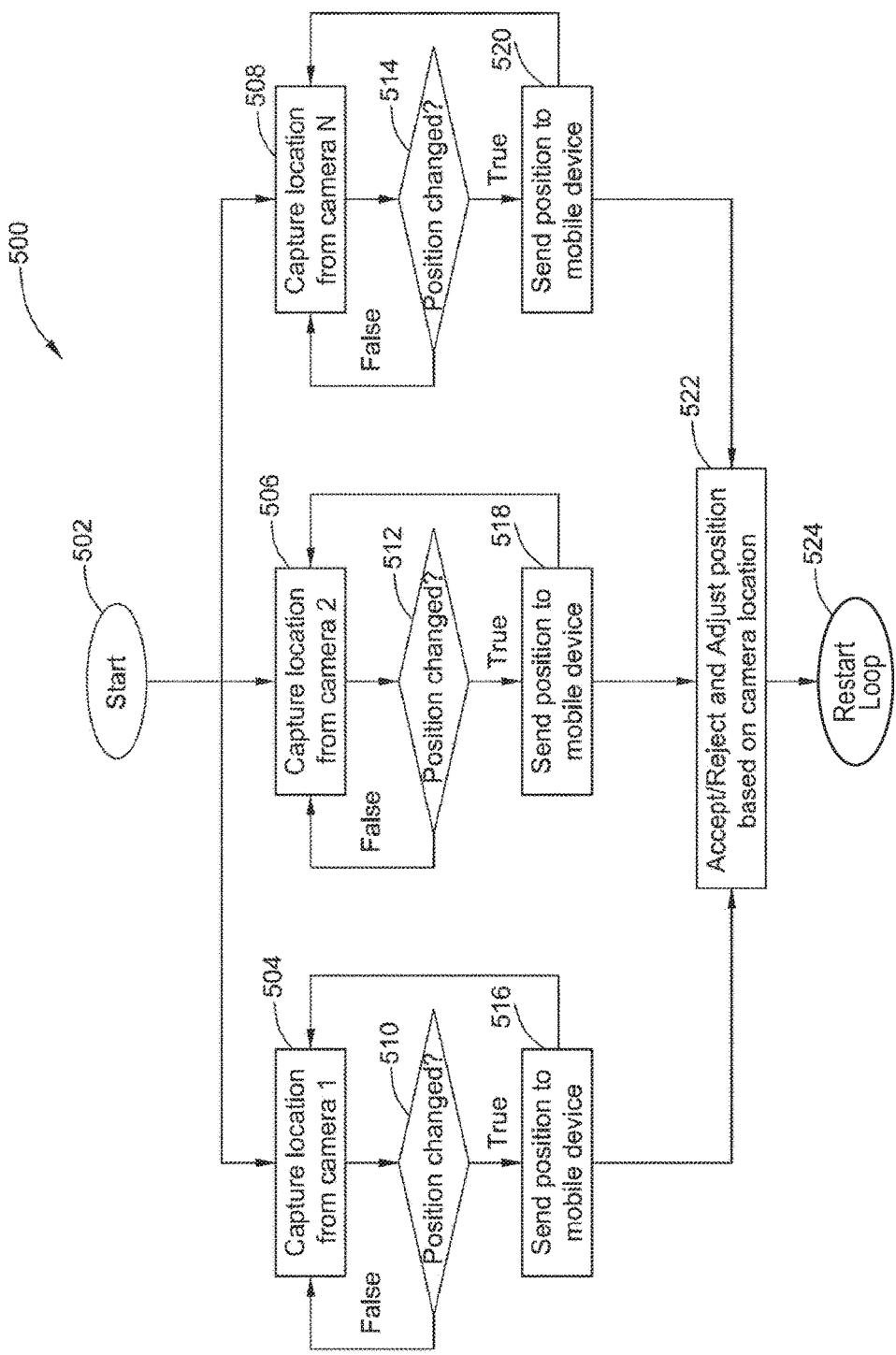
FIG. 5 is a flowchart of a positioning determining process of a visible light communication (VLC) mobile device in accordance with some embodiments of the disclosure.

FIG. 5 is a flowchart of a positioning determining process 500 of the VLC mobile device in accordance with some embodiments. At the start 502, location information is captured 504, 506 and 508 from one or more of the cameras of the camera array resident on the VLC mobile device, and a determination made 510, 512, 514 by one or more of the single board processors associated with the cameras if the position of the VLC mobile device has changed (by decoding the light signal received from a light fixture). If the position has not changed, then the process loops back and location data is again captured from each camera of the camera array. However, if the position of the VLC mobile device has changed, then one or more of the single board processors maps 516, 518, 520 the position of the VLC mobile device, and next accepts or rejects and/or adjusts 522 the position of the VLC mobile device based on the determined camera location, and the process is restarted 524. In some embodiments, when a current camera position is accepted and/or adjusted 522, in addition to restarting the process 524, one or more of the single board processors transmit (not shown) the new VLC device location coordinates to one or more routers (see FIG. 4).

Figure 6:
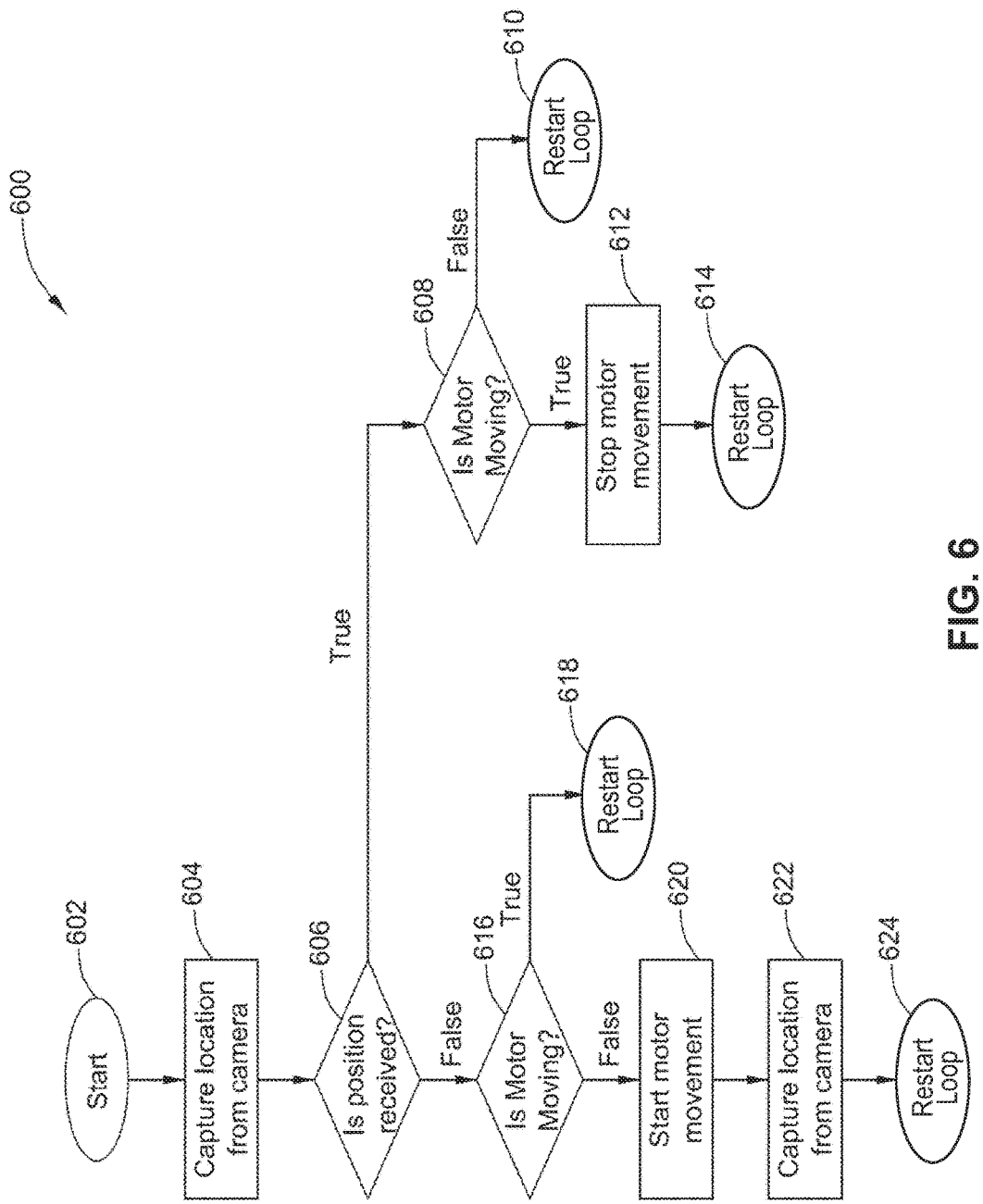
FIG. 6 is a flowchart of an automatic camera positioning process in accordance with some embodiments.

FIG. 6 is a flowchart of an automatic camera positioning process 600 in accordance with some embodiments of a VLC mobile device. In particular, the camera positioning process 600 can be utilized with an implementation of a VLC mobile device that includes means for adjusting the position of one or more of the cameras of the camera array (for example, one or more servo-motors under control of one or more of the single board processors). Thus, the process starts 602 when a user initializes the VLC mobile device (for example, by switching power on) and one or more of the cameras captures 604 location information by receiving light signals from one or more light fixtures. If position information is received 606 from a particular camera, then a determination is made if the motor associated with that camera is operating to move the camera or not 608. If motor is not operating to move the camera, then the process is restarted 610, but if the camera is being moved then the associated motor is stopped 612 before restarting 614 the process. Referring again to step 606, if position information is not received from a particular camera, then a determination is made if the motor associated with that camera is operating 616. If so, then since that camera is scanning for a light signal, the process is restarted 618. However, if not then the motor is started 620 so that the camera is moving to scan for a light fixture signal, location information is then captured from that camera 622, and then the process is restarted 624. In this manner, the cameras which have not captured light data and/or location information are being moved to scan for light signals until they do receive light signals from a light fixture, while those cameras already receiving light signals are not moved as the VLC mobile device is operational and/or in motion.

Up to this point in the disclosure, all of the examples provided herein of a visible light communication (VLC) mobile device include an array of cameras to detect light signals from a plurality of indoor light fixtures, for example, in a warehouse environment. However, it should be understood that such a VLC mobile device could also be used outdoors to capture information from a plurality of different objects in order to determine location. For example, light from outdoor utility lamps, building display lamps, walkway luminaires, car headlights and/or tail lights, and or other light sources could be utilized.

Furthermore, the VLC mobile device embodiments described herein could be modified to detect markers other than light sources in order to determine positioning data and/or other desirable information. For example, a marker may consist of any type of identifying feature of a building or other structure, such as signage, sprinkler system heads, air ducts, support structures, speakers, and the like features, wherein such markers could be detected by a mobile device in accordance with the processes described herein. Furthermore, instead of (or in addition to) a camera array, the mobile device may include one or more transducers for use in position sensing and/or determination. In particular, a transducer is an electronic device that converts energy from one form to another, and such devices may include, but are not limited to, microphones, loudspeakers, thermometers, pressure sensors, ultrasonic sensors, magnetic sensors, antenna, and the like. An array of transducers could be configured to detect signals from, for example, a loudspeaker, a high frequency emitter, a heat source, and/or other types of markers. As previously mentioned, in one embodiment, the transducers may comprise an array of acoustic detectors, and wherein the markers comprise a plurality of acoustic transmitters. Acoustic transmitter refers to any device which transmits a sound signal, including frequencies that are beyond the audible range of humans. Acoustic detectors are corresponding devices which interpret the signals of acoustic transmitters. In another embodiment, the transducers comprise an array of thermal signature detectors, the markers comprise a plurality of thermal transmitters. Similarly, thermal transmitter refers to any device which transmits a thermal signal. The thermal signal may comprise thermal radiation, a convection current, or thermal conduction. Thermal signature detectors are corresponding devices which interpret the signal of the thermal transmitter. One embodiment of a thermal detector is a thermal or infrared camera which detects the thermal radiation of a surface, such as a hot water pipe, or the presence of a convection current, such as the air from an air duct. Thermal transmitters may include existing infrastructure of an environment or markers that are specifically placed to optimize the ability to detect position.

Thus, various embodiments disclosed herein include mobile device embodiments that include multiple transducers or multiple camera arrays for determining the position coordinates of the mobile device, which embodiments increases the effective pixel density and/or the field of view of the mobile device. The increase in the effective pixel density and/or field of view of the mobile device results in a reduction of the fixture density (or feature density or marker density) that is required to achieve one hundred percent (100%) coverage of an area of interest (such as a warehouse floor area).

Disclosed embodiments therefore solve the technological problem of how to provide low-cost mobile devices which incorporate multiple transducers (such as an array of cameras) configured for receiving signals from one or more markers, and for determining position coordinates while also increasing the effective pixel density and/or the field of view of the mobile device. Such increases in the effective pixel density and/or field of view of the mobile device results in a reduction of the fixture density or marker density so that one hundred percent (100%) coverage of an area of interest is easier to achieve.

As used herein, devices, including those associated with the VLC mobile device and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a Wifi network, a wireless LAN network, and/or an Internet Protocol ("IP") network such as the Internet, an intranet, or an extranet. Note that any devices described herein may communicate via one or more such communication networks.

It should be understood that the above descriptions and/or the accompanying drawings are not meant to imply a fixed order or sequence of steps for any process or method of manufacture referred to herein. Thus, any disclosed process may be performed in any order that is practicable, including but not limited to simultaneous performance of one or more steps that are indicated as sequential.

Although the present invention has been described in connection with specific exemplary embodiments, it should be understood that various changes, substitutions, modifications and/or alterations apparent to those skilled in the art can be made to the disclosed apparatus and/or processes without departing from the spirit and scope of the invention as set forth in the appended claims.

What is claimed is:

1. A position determination system, comprising:
a mobile device comprising at least two transducers each mounted to an adjustable carrier, wherein each transducer is operably connected to at least one single board processor; and
a plurality of markers, each associated with a position of an area of interest, the plurality of markers at least one of: operable to transmit signals recognizable by the at least two transducers, and comprising at least one feature recognizable by the at least two transducers.

2. The position determination system of claim 1, wherein the at least two transducers comprise an array of cameras.

3. The position determination system of claim 1, wherein the plurality of markers comprises a plurality of light fixtures.

4. The position determination system of claim 1, wherein the plurality of markers comprises a plurality of modulators for modulating the light fixtures.

5. The position determination system of claim 1, further comprising at least one router configured to wirelessly communicate with the at least one single board processor and to receive position data associated with the mobile device.

6. The position determination system of claim 1, further comprising a materials management computer configured to wirelessly communicate with the router and to receive position data associated with the mobile device.

7. The position determination system of claim 1, wherein the mobile device is at least one of mounted to a movable machine or carried by a user.

8. The position determination system of claim 1, wherein the mobile device further comprises at least one motor operably connected to at least one transducer and configured to adjust a sensing angle of the at least one transducer.

9. The position determination system of claim 1, wherein the at least one single board processor includes instructions for determining the position of the mobile device based on data provided by the at least two transducers.

10. The position determination system of claim 1, wherein the at least two transducers comprise an array of acoustic detectors and the plurality of markers comprises a plurality of acoustic transmitters.

11. The position determination system of claim 1, wherein the at least two transducers comprise an array of thermal signature detectors and the plurality of markers comprises a plurality of thermal transmitters.

12. A mobile device assembly, comprising:
a mobile device comprising at least two transducers each mounted to an adjustable carrier, the at least two transducers for recognizing a plurality of markers via recognizable feature of the markers or signals transmitted from the markers, and
at least two single board processors operably connected to at least two transducers respectively.

13. The mobile device assembly of claim 12, wherein the at least two transducers comprise an array of cameras.

14. The mobile device assembly of claim 12, wherein the markers are enabled to produce recognizable feature or transmit signals by at least two modulators.

15. The mobile device assembly of claim 12, further comprising at least one motor operably connected to at least one transducer and configured to adjust a sensing angle of the at least one transducer.

16. The mobile device assembly of claim 12, wherein the at least one single board processor includes instructions for determining the position of the mobile device based on data provided by the at least two transducers.

17. A mobile device assembly of claim 12, comprising:
a mobile device comprising at least two transducers for recognizing a plurality of markers via recognizable feature of the markers or signals transmitted from the markers,
at least two single board processors operably connected to at least two transducers respectively;
wherein the at least two transducers comprise an array of acoustic detectors and the plurality of markers comprises a plurality of acoustic transmitters.

18. A mobile device assembly, comprising:
a mobile device comprising at least two transducers for recognizing a plurality of markers via recognizable feature of the markers or signals transmitted from the markers,
at least two single board processors operably connected to at least two transducers respectively;
wherein the at least two transducers comprise an array of thermal signature detectors and the plurality of markers comprises a plurality of thermal transmitters.

19. A positioning method of a mobile device comprising at least two transducers each mounted to an adjustable carrier, the method comprising:
recognizing signals or a feature of at least one marker via the at least two transducers each mounted to an adjustable carrier; and
decoding the signals or the feature via one or more single board processors of the mobile device to receive a position of the mobile device.

20. The positioning method of claim 19, comprising moving the transducers via the adjustable carriers when the position of the mobile device is not received.

* * * * *